(12) United States Patent
Richison et al.

(10) Patent No.: US 9,149,894 B2
(45) Date of Patent: Oct. 6, 2015

(54) FENCE SYSTEM

(75) Inventors: Clifford Marion Richison, Tulsa, OK (US); Brett Jason Richison, Jenks, OK (US)

(73) Assignee: FenceTrac Fence Systems, Inc., Tulsa, OK (US)

( * ) Notice: Subject to any disclaimer, the term of this patent is extended or adjusted under 35 U.S.C. 154(b) by 80 days.

(21) Appl. No.: 13/571,855

(22) Filed: Aug. 10, 2012

(65) Prior Publication Data

US 2013/0320281 A1  Dec. 5, 2013

Related U.S. Application Data (60) Provisional application No. 61/524,976, filed on Aug. 18, 2011.

(51) Int. Cl.
  *E04H 17/00* (2006.01)
  *B23P 11/00* (2006.01)
  *E04H 17/16* (2006.01)

(52) U.S. Cl.
  CPC .............. *B23P 11/00* (2013.01); *E04H 17/003* (2013.01); *E04H 17/166* (2013.01); *Y10T 29/49826* (2015.01)

(58) Field of Classification Search
  USPC .......... 256/19, 24, 65.01, 65.03, 65.04, 65.06
  See application file for complete search history.

(56) References Cited

U.S. PATENT DOCUMENTS

| | | | |
|---|---|---|---|
| 2,789,792 A | 4/1957 | Davis | |
| 3,037,593 A | 6/1962 | Webster | |
| 3,157,255 A | 11/1964 | Sondheim | |
| 3,395,489 A | 8/1968 | Banse | |
| 3,454,262 A * | 7/1969 | Romano | 256/19 |
| 3,522,933 A | 8/1970 | Braun, III | |
| 3,648,981 A | 3/1972 | Allen | |
| 4,188,019 A | 2/1980 | Meredith | |
| 5,192,056 A | 3/1993 | Espinueva | |
| 5,480,126 A * | 1/1996 | Teasdale | 256/19 |
| 5,702,090 A | 12/1997 | Edgman | |
| 5,938,184 A * | 8/1999 | DeSouza | 256/19 |
| 5,988,599 A | 11/1999 | Forbis | |
| 6,041,486 A | 3/2000 | Forbis | |

(Continued)

FOREIGN PATENT DOCUMENTS

FR  2646195 A1 * 10/1990 ............. E04H 17/16

OTHER PUBLICATIONS

Bradford, "Modular Fence Frame System", Jul. 27, 2011, Publisher: www.invention.net/bradford.htm.

*Primary Examiner* — Daniel Wiley
(74) *Attorney, Agent, or Firm* — Fellers, Snider, Blankenship, Bailey & Tippens, P.C.

(57) ABSTRACT

A fence panel and method of assembly. The fence panel includes end brackets that are affixed to panel facing sides of fence uprights. A top rail and a base rail span between the uprights. Panel and spacer members are secured between the top and base rails. The fence panel construction method facilitates construction of lengths of fence by a single person by first installing uprights in the ground, then affixing the base rail to the uprights. A magnetic strip spans between the uprights. Spacers and panels are supported by the base rail and by the magnetic strip. After placement of the spacers and panels, a top rail is positioned between the uprights and adjacent to upper ends of the spacers and panels, thereby securing the spacers and panels between the top rail and the base rail to form a fence panel.

19 Claims, 12 Drawing Sheets

(56) References Cited

U.S. PATENT DOCUMENTS

| | | | |
|---|---|---|---|
| 6,152,428 A * | 11/2000 | Simioni | 256/24 |
| 6,202,987 B1 | 3/2001 | Forbis | |
| 6,345,809 B1 | 2/2002 | Bebendorf | |
| 6,398,193 B1 * | 6/2002 | DeSouza | 256/65.06 |
| 6,478,287 B2 | 11/2002 | DeSouza | |
| 6,595,497 B1 | 7/2003 | Linford et al. | |
| 6,719,277 B2 * | 4/2004 | Ohanesian | 256/19 |
| 6,772,998 B2 | 8/2004 | Bebendorf | |
| 6,779,781 B2 | 8/2004 | Bebendorf | |
| D621,061 S | 8/2010 | Petrucelli et al. | |
| 2006/0113517 A1 * | 6/2006 | Colantonio et al. | 256/24 |
| 2006/0278862 A1 * | 12/2006 | Ohanesian | 256/24 |
| 2007/0045602 A1 | 3/2007 | Hathorn, Jr. | |
| 2009/0194754 A1 | 8/2009 | Timothy | |
| 2010/0096608 A1 | 4/2010 | McCarthy et al. | |
| 2010/0200825 A1 * | 8/2010 | Hill | 256/24 |
| 2010/0314597 A1 | 12/2010 | Rodriguez et al. | |
| 2011/0121249 A1 | 5/2011 | Walker | |
| 2011/0233496 A1 * | 9/2011 | Caruso | 256/24 |

* cited by examiner

FENCE SYSTEM

CROSS REFERENCE TO RELATED APPLICATIONS

This application claims the priority of U.S. Provisional Patent Application No. 61/524,976 entitled "FENCE SYSTEM," filed Aug. 18, 2011, the contents of which are hereby incorporated by reference.

FIELD OF THE INVENTION

The invention relates to a system and method of construction of a fence panel. More particularly, the invention relates to a fence panel and method of construction wherein vertical members may be easily located between a top rail and a bottom rail in a variety of configurations.

BACKGROUND OF THE INVENTION

The use of fences is widespread. Fences are available in various materials and configurations to meet the needs of consumers. For example, common fence types for residential or light commercial use include chain link fence and picket fence. However, variations of these types or configurations of fences are available to provide aesthetic alternatives for consumers. Some fence variants provide fence panels that are assembled off-site and transported to the installation site. Other fence variants require multiple workers to construct and erect fence panels.

SUMMARY OF THE INVENTION

The fence system of the invention provides a versatile platform that allows for various fence configurations to be easily constructed. The fence system includes a section of fence that includes first and second uprights, which may be fence posts but which can be any structure, including a wall or existing fence. Horizontal segments, such as an upper and a lower rail, span between the uprights. Upper and lower rails may be formed of U-channel segments. First and second end brackets are affixed to the uprights. End brackets may also be formed of U-channel members. End brackets and rails formed of inwardly facing lengths of U-channel can receive a plurality of vertical members such as plank segments and spacer members, such as H-members. Alternatively, vertical planks can be received within the fence section, or other vertical members may be received within the fence section. In one embodiment, additional decorative or security related attachments may be installed above the upper rail. The horizontal segments preferably cap the upper and lower ends of the end brackets. Advantages of the fence system of the invention include versatility, i.e., an ability to easily install a fence having customer selected materials and appearance, including locating optional decorative inserts between H-members, while utilizing a fence frame of a particular configuration. The fence system of the invention produces an attractive fence having the same appearance on both sides. Further, the metal frame results in a strong fence that is able to withstand heavy winds.

DETAILED DESCRIPTION OF THE PREFERRED EMBODIMENTS

Figure 5:
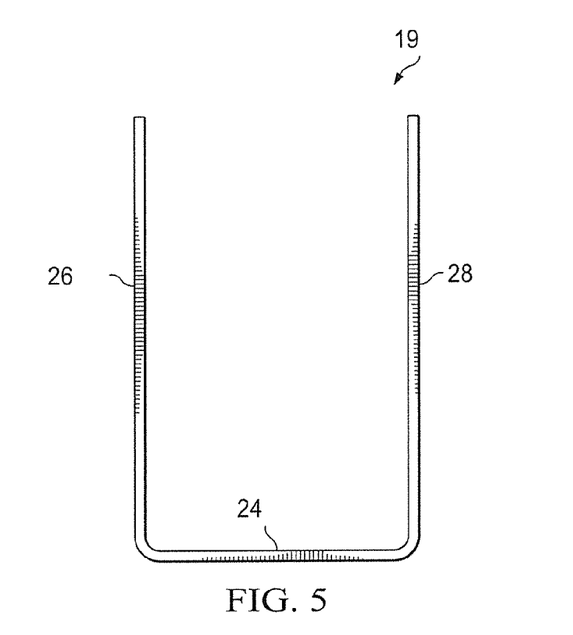
FIG. 5 is a cross-sectional view of the first and second end brackets of FIGS. 1 and 2.
Figure 6:
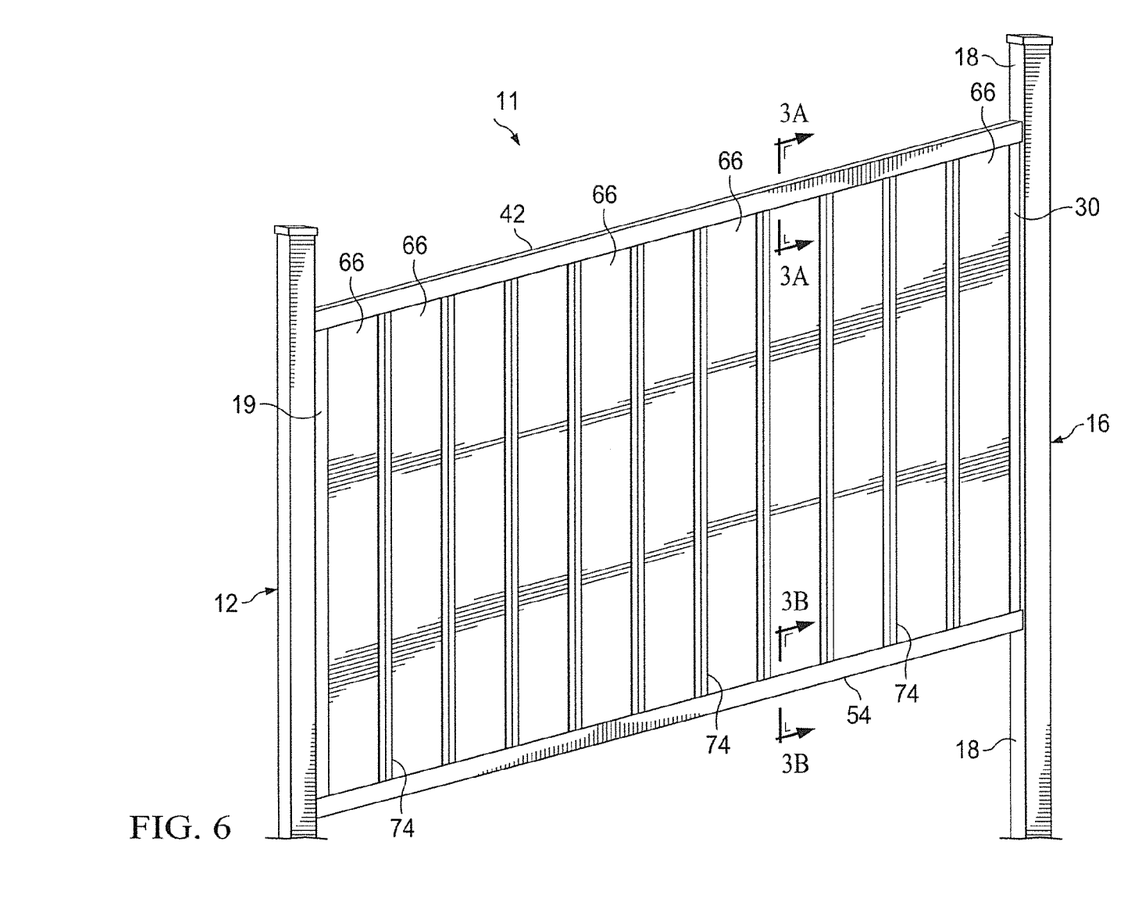
FIG. 6 is a perspective view of an embodiment of the invention having spacer members between adjacent plank panel members.
Figure 7:
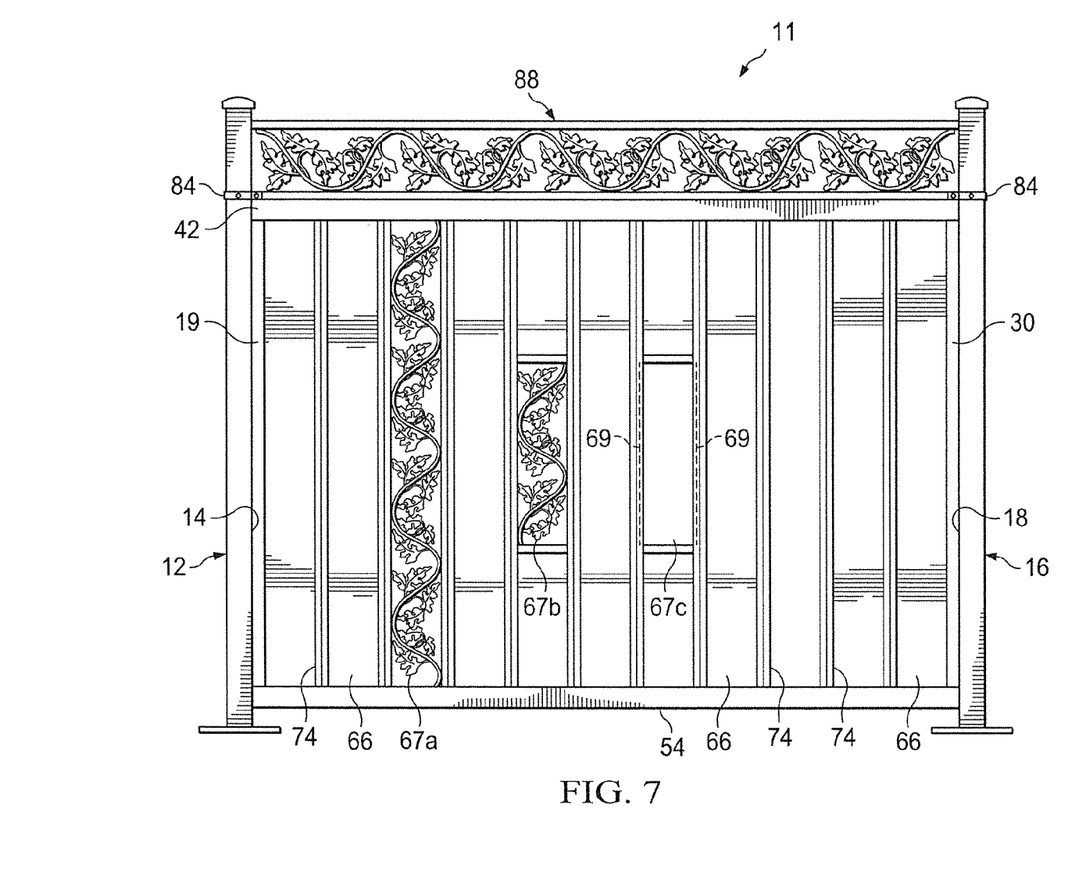
FIG. 7 is an elevation view of an embodiment of the invention having spacer members between adjacent plank panel members having a variety of panel configurations and having a decorative member located above the top rail of FIG. 1.
Figure 8:
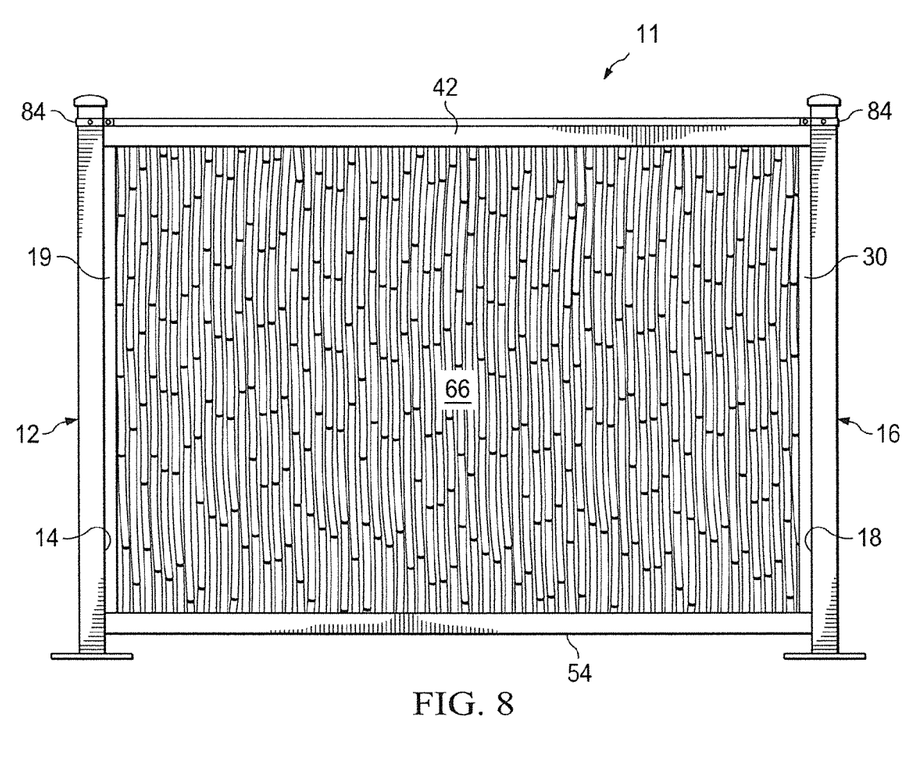
FIG. 8 is an elevation view of an embodiment of the invention wherein bamboo rods are installed as panel members.
Figure 9:
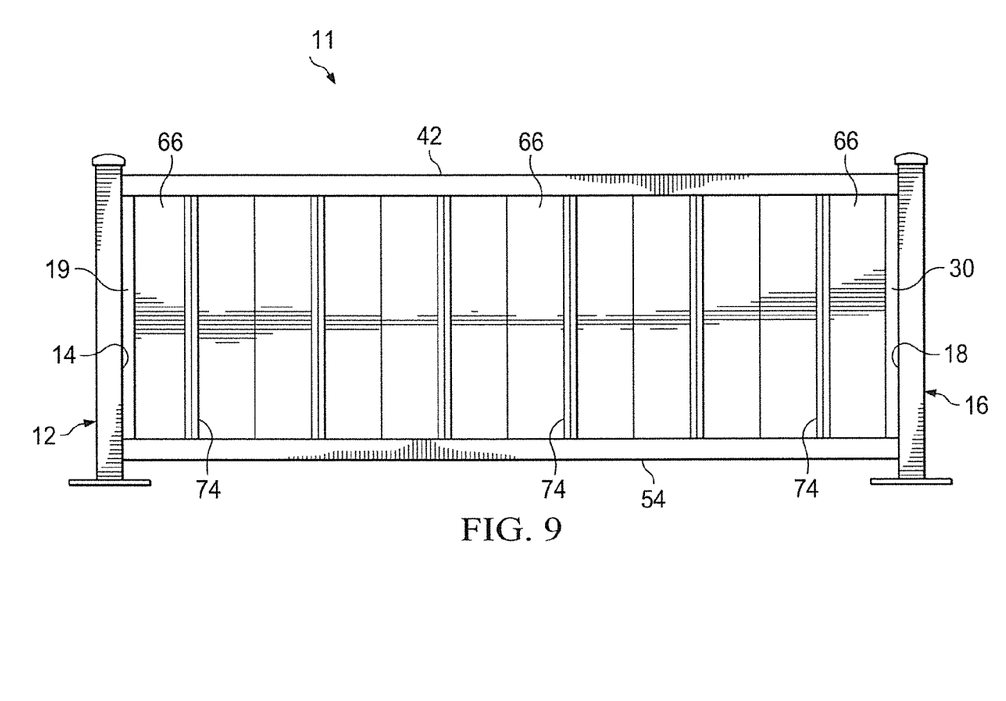
FIG. 9 is an elevation view of an embodiment of the invention having spacer members between selected plank panel members.
Figure 10:
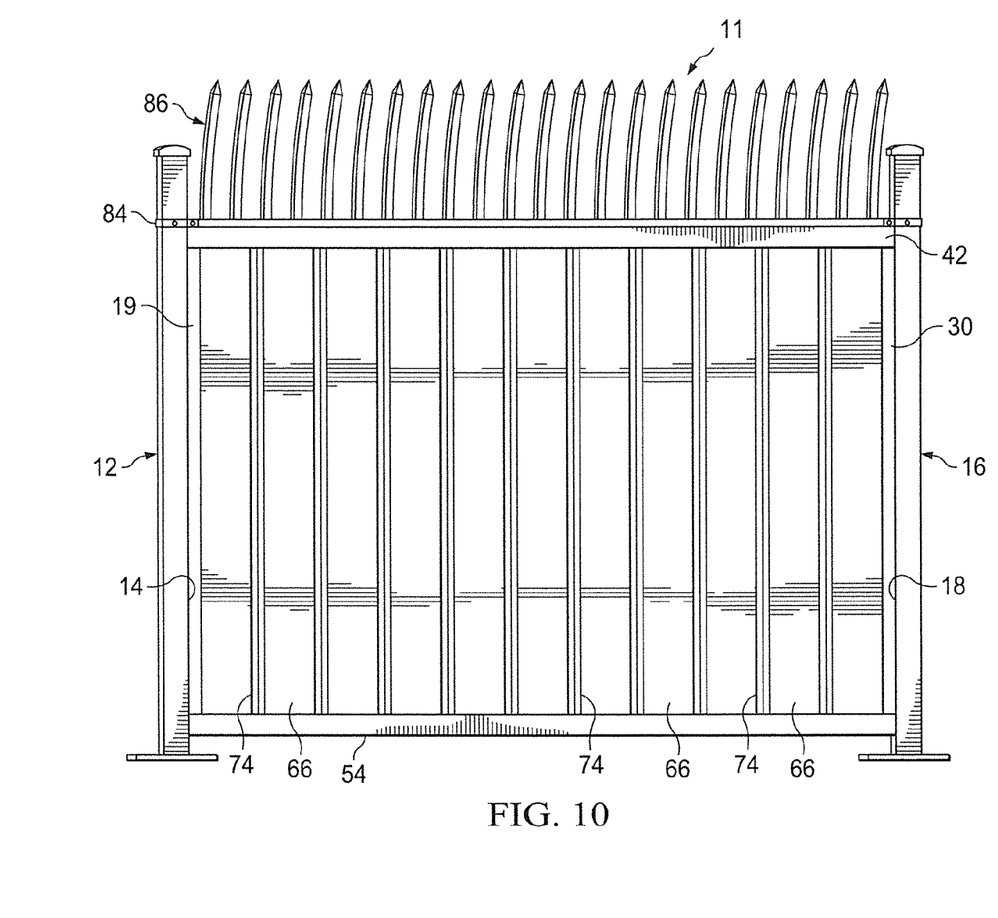
FIG. 10 is an elevation view of an embodiment of the invention having spacer members between adjacent plank panel members and having a security member located above the top rail of FIG. 1.

Referring now to FIGS. 1, 2, and 6-10, a fence panel is designated generally 10. Fence panel 10 includes a stationary panel 11 (FIGS. 1, 6-11) that includes a first upright, such as first post 12, having a panel facing side 14. Stationary panel 11 includes a second upright, such as second post 16, having panel facing side 18. First end bracket 19 (FIGS. 1, 2, 5-12) is preferably formed of a length of U-channel having an upper end 20, a lower end 22, a web 24, a first leg 26 (FIG. 5) and a second leg 28 (FIG. 5). Web 24 is affixed to panel facing side 14 of first post 12.

A second end bracket 30 (FIGS. 1, 2, 5, and 6-12) is preferably formed of a length of U-channel having an upper end 32, a lower end 34, a web 36, a first leg 38 (FIG. 5) and a second leg 40 (FIG. 5), wherein web 36 is affixed to panel facing side 18 of second post 16. In one embodiment, end brackets 19 and 30 have legs 26 and 28 or 38 and 40 that are 1.536±0.050 inches in width and that are spaced apart by 0.800±0.050 inches. End brackets 19, 30 are preferably provided with web orifices 31 (FIG. 2) for receiving fasteners for affixing end brackets 19, 30 to uprights. End brackets 19, 30 may also be provided with end orifices 33 (FIG. 1) for receiving a fastener for affixing one or both of top rail 42 and base rail 54. Web 24 and web 36 are preferably affixed to posts 12 and 16, respectively, with bolts (not shown), received in web orifices 31, although other fasteners or other methods of attachment are also contemplated, such as welding. Posts 12 and 16 can be of any configuration or material, so long as posts 12 and 16 are capable of receiving end brackets 19 and 30. Although posts 12 and 16 are shown as example uprights, it should be understood that any surface may function as an upright, so long as the upright is capable of receiving an end bracket, e.g., end bracket 19 or 30. Examples of other surfaces that are contemplated for use as uprights include walls, masonry, other fence panels, etc.

A top rail 42 (FIGS. 1-3A and 6-11) forms an upper portion of fence panel 10. Top rail 42 is preferably formed of a length of U-channel having first end 44 and second end 46, web 48 (FIG. 3A), first leg 50 (FIG. 3A) and second leg 52 (FIG. 3A).

Figure 1:
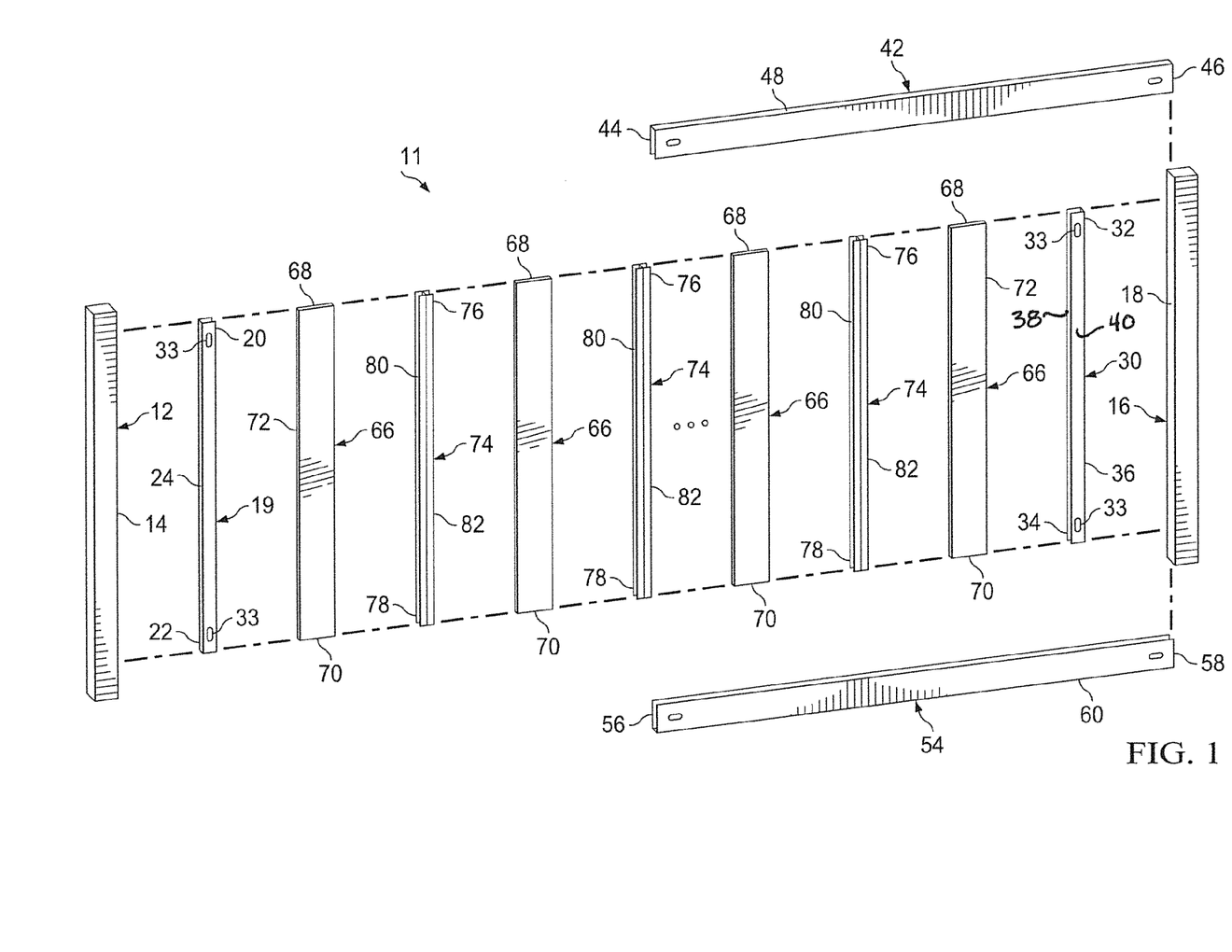
FIG. 1 is a perspective exploded view of a fence panel of the invention.

Referring now to FIG. 1, upper end 20 of first end bracket 19 is received between first leg 50 and second leg 52 of top rail 42 proximate first end 44 of top rail 42. Upper end 32 of second end bracket 30 is received between first leg 50 and second leg 52 of top rail 42 proximate second end 46 of top rail 42. In a preferred embodiment, top rail 42 is bolted onto upper end of first end bracket 19 and to upper end of second end bracket 30.

A base rail 54 (FIGS. 1, 2, 3B and 6-11) forms a lower portion of fence panel 10. Base rail 54 is preferably formed of a length of U-channel having first end 56, second end 58, web 60 (FIG. 3B), first leg 62 (FIG. 3B) and second leg 64 (FIG. 3B). In one embodiment, legs 50 and 52 or 62 and 64 are 3.00 inches wide, and are formed from 16 gauge metal having a thickness of 0.49 inches. A flat hem may be found at a distal end of legs 50 and 52 or 62 and 64 having a width of 0.200±0.25 inches. Preferably, the flat hem bends inwardly, as is shown in FIGS. 3A and 3B, thereby creating an air space surrounding panels 66 and 74, which assists in moisture dissipation. Preferably, base rail 54 is provided with drain holes 65 (FIG. 3B) at 6 inch intervals along web 66.

Referring now to FIG. 1, lower end 22 of first end bracket 19 is received between first leg 50 and second leg 64 of base rail 54 proximate first end 56 of base rail 54. Lower end 34 of second end bracket 30 is received between first leg 62 and second leg 64 of base rail 54 proximate second end 58 of base rail 54. In a preferred embodiment, base rail 54 is bolted onto lower ends of first end bracket 19 and second end bracket 30.

Figure 2:
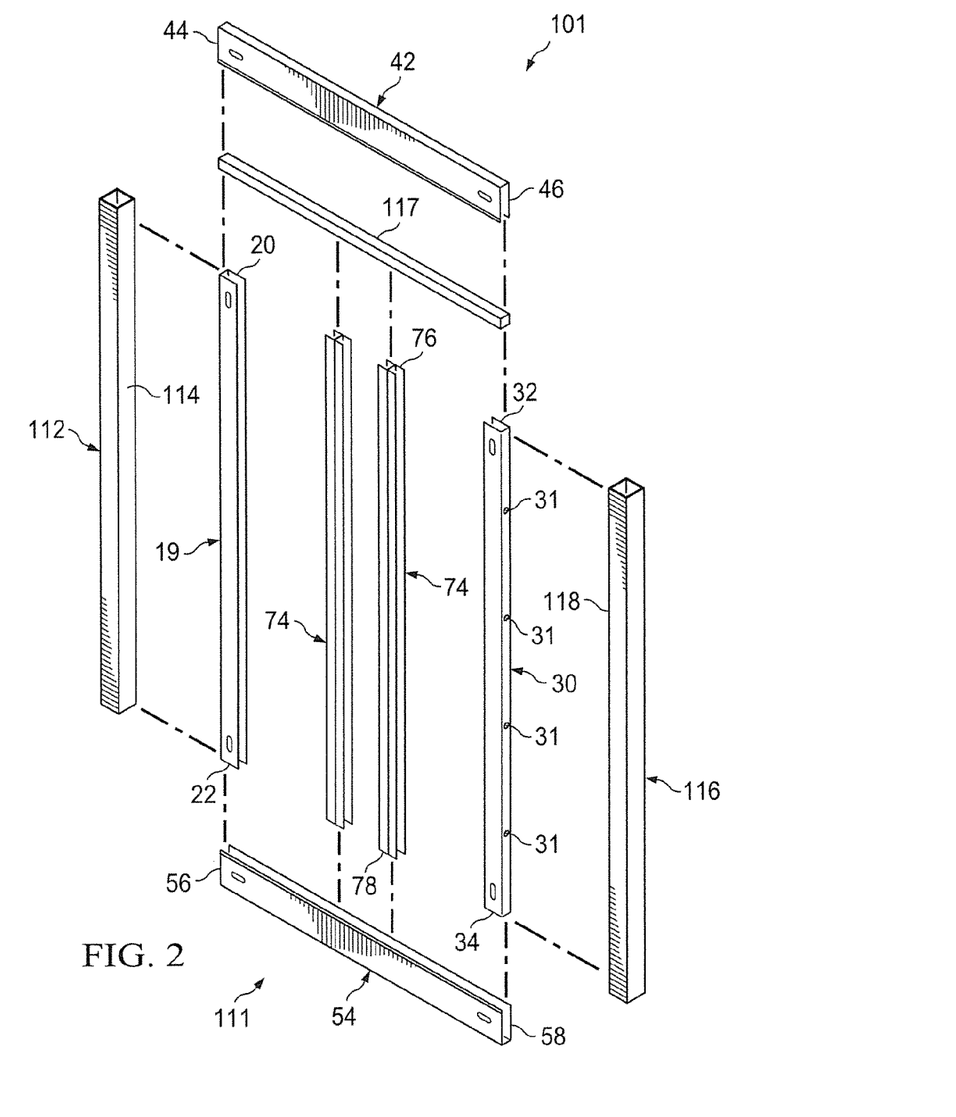
FIG. 2 is a perspective exploded view of a gate panel of the invention.
Figure 3A:
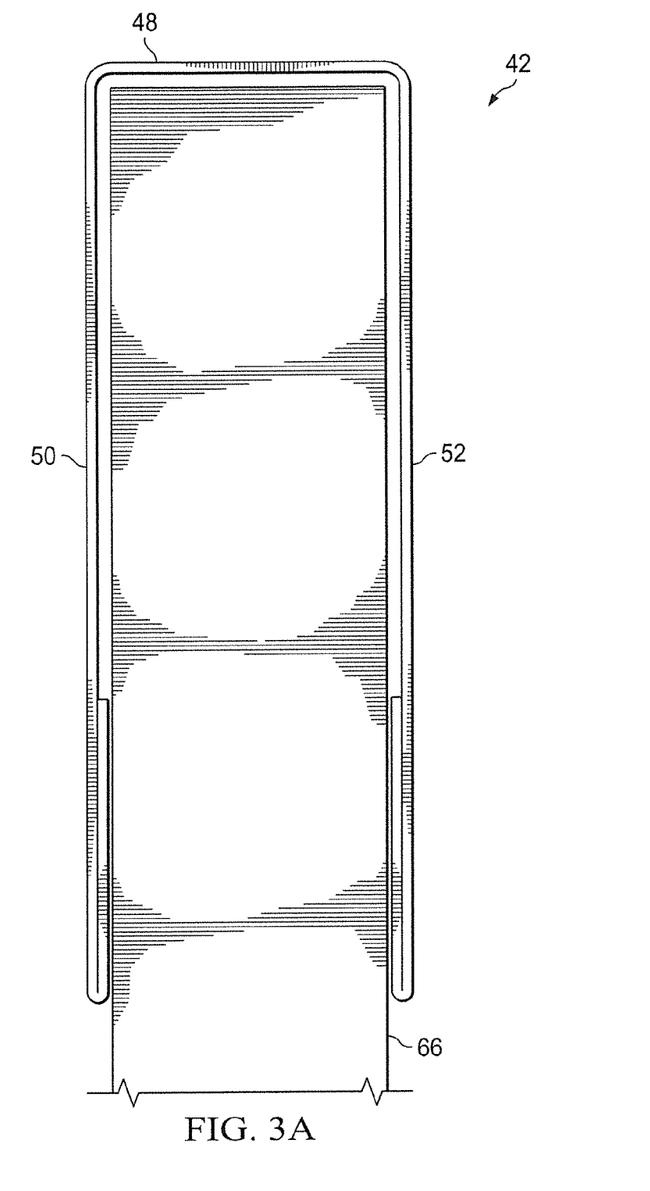
FIG. 3A is a cross-sectional view of the top rail of FIGS. 1 and 2.
Figure 3B:
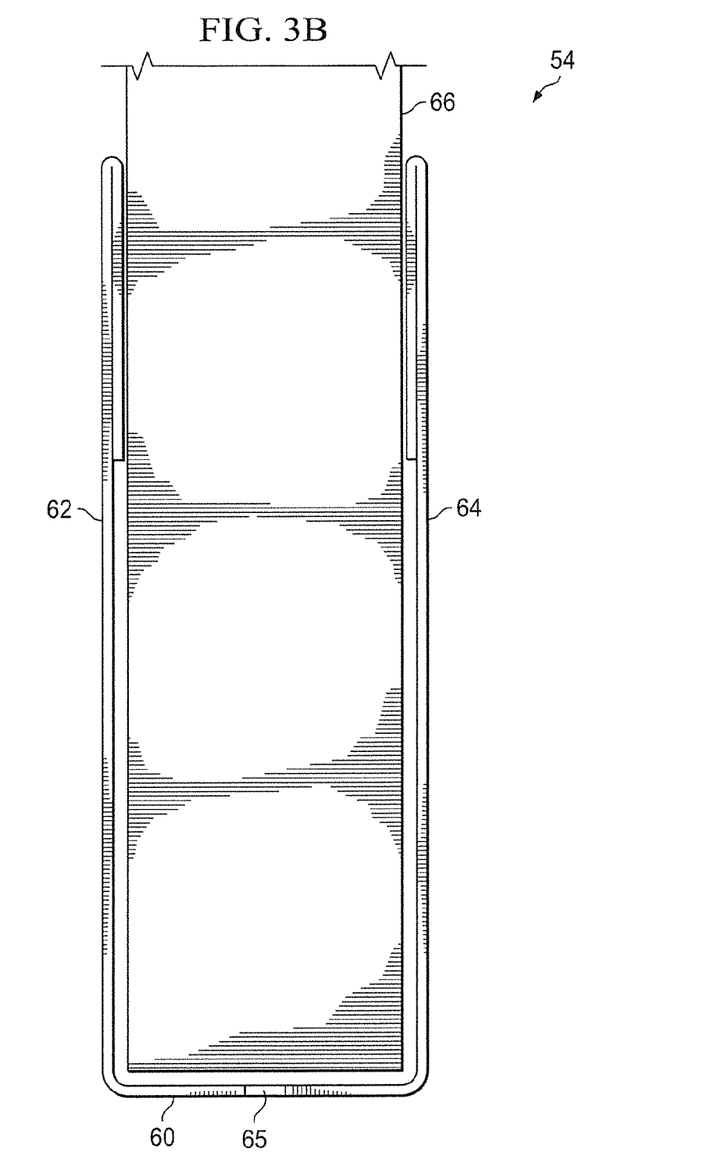
FIG. 3B is a cross-sectional view of the bottom rail of FIGS. 1 and 2.
Figure 11:
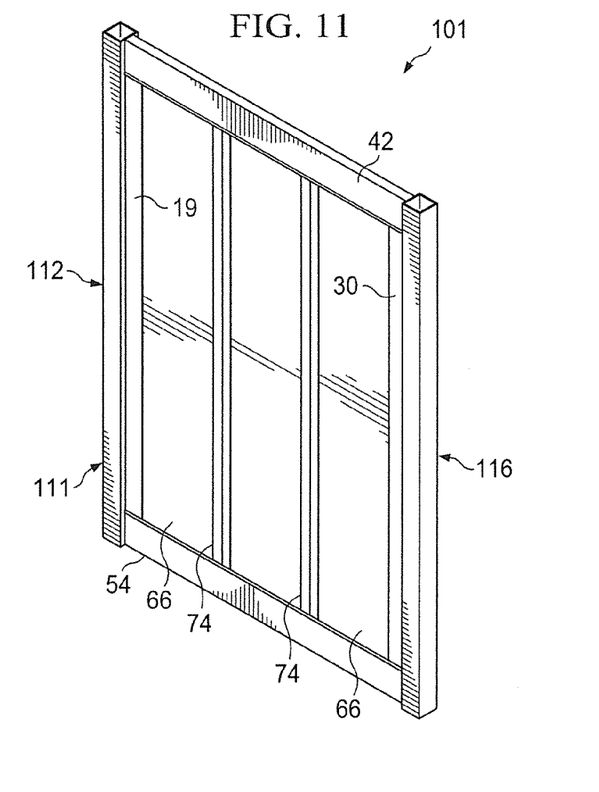
FIG. 11 is a perspective view of an assembled gate panel of FIG. 2.

Referring now to FIGS. 2 and 11, fence panel 10 may also be a gate panel 101. Gate panel 101 includes a frame 111 that includes first upright 112, second upright 116, base rail 54 and top member 117 (FIG. 2). The components of frame 111 are preferably welded together to form a rigid structure. In an alternative embodiment, a bottom member may be provided that is similar to top member 117 but located adjacent to lower ends of end brackets 19, 30 for receiving lower ends of end brackets 19, 30. Base rail 54 may be welded to uprights 112, 116 as is shown in FIG. 11. First upright 112 has a panel facing side 114 and a second upright 116 has panel facing side 118. First end bracket 19 is preferably formed of a length of U-channel having an upper end 20, a lower end 22, a web 24, a first leg 26 and a second leg 28. Web 24 is affixed to panel facing side 114 of first upright 112.

A second end bracket 30 is preferably formed of a length of U-channel having an upper end 32, a lower end 34, a web 36, a first leg 18 and a second leg 40. Web 36 is affixed to panel facing side 18 of second upright 116. Web 24 and web 36 are preferably affixed to uprights 112 and 116, respectively, with bolts (not shown), although other fasteners or other methods of attachment are also contemplated, such as welding. Uprights 112 and 116 can be of any configuration or material, so long as uprights 112 and 116 are capable of receiving end brackets 19 and 30.

Still referring primarily to FIG. 2, top rail 42 forms an upper portion of gate panel 101. Top rail 42 is preferably formed of a length of U-channel having first end 44 and second end 46, web 48, first leg 50 and second leg 52. Upper end 20 of first end bracket 19 is received between first leg 50 and second leg 52 of top rail 42 proximate first end 44 of top rail 42. Upper end 32 of second end bracket 30 is received between first leg 50 and second leg 52 of top rail 42 proximate second end 46 of top rail 42. In a preferred embodiment, top rail 42 is bolted onto upper ends of first end bracket 19 and second end bracket 30.

Base rail 54 forms a lower portion of frame 111. Base rail 54 is preferably formed of a length of U-channel having first end 56, second end 58, web 60, first leg 62 and second leg 64. Lower end 22 of first end bracket 19 is received between first leg 50 and second leg 64 of base rail 54 proximate first end 56 of base rail 54. Lower end 34 of second end bracket 30 is received between first leg 62 and second leg 64 of base rail 54 proximate second end 58 of base rail 54. In a preferred embodiment, base rail 54 is welded onto lower ends of first upright 112 and second upright 116 to form a rigid frame 111.

In one embodiment, a plurality of panel members 66 (FIGS. 1, 6, and 8-12) are located between top rail 42, base rail 54, first upright 12, 112 and second upright 16, 116 of stationary panel 11 and/or gate panel 101. At least one panel member 66 has an upper edge 68 (FIG. 1) that is received between first leg 50 and second leg 52 of top rail 42. At least one panel member 66 has a lower edge 70 (FIG. 1) that is received between first leg 62 and second leg 64 of base rail 54. In one embodiment, at least one of panel members 66 has a side edge 72 received in one of first end bracket 19 and second end bracket 30. Panel members 66 may be planks (FIGS. 1, 6, 7, and 9-12) of wood, vinyl, glass, or other materials or may be rods of bamboo (FIG. 8), metal, wood or other materials. Additionally, other materials such as concrete board, composite materials, plywood or other types of planks may be used as panel members 66. Further, in some embodiments, vertical space can be filled with decorative members 67a, partial decorative panel 67b, or "window" 67c. In the case of partial panel 67b and window panel 67c, short segments of panel member 66 are placed above and/or below the partial members 67b and 67c. Window panel 67c is preferably provided with vertical legs 69 that are hidden within receiving areas 80 and 82 of spacer members 74.

Figure 4:
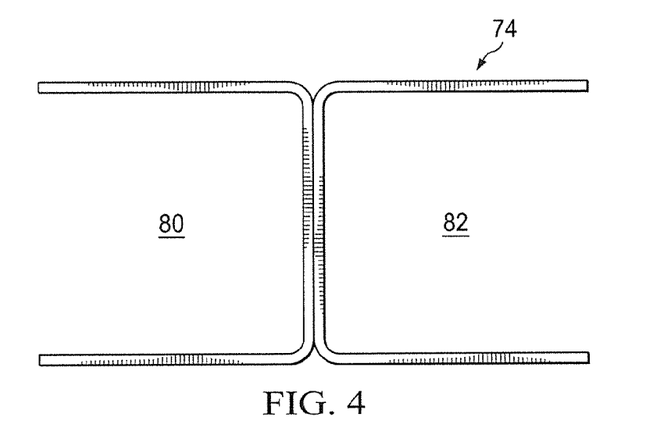
FIG. 4 is a cross-sectional view of spacer members of FIGS. 1 and 2.

In one embodiment, a plurality of spacer members, such as spacer members 74 (FIGS. 1, 2, 4, 6, 7, and 9-12) are located between adjacent panel members 66. Spacer members are preferably metallic, but may be constructed of other material, such as plastic or other suitable materials. Spacer members preferably have an "H" shaped cross-section. Spacer members 74 have an upper end 76, a lower end 78, a first receiving area 80 (FIG. 4) and a second receiving area 82 (FIG. 4). Spacer members 74 are positioned to extend between top rail 42 and base rail 54. A first panel member 66 is received in first receiving area 80 of spacer member 74. A second panel member 66 is received in second receiving area 82 of spacer member 74. In one embodiment, (FIG. 9), spacer members 74 are located between selected ones of panel members 66, but not between all panel members 66. In this embodiment, adjacent surfaces of panel members 66 may be provided with interlocking structures, such as tongue and groove.

As can be seen in FIGS. 1 and 2, panel members 66 and spacer members 74 "float" within fence panel 10 or gate panel 101. As used in this application, "float" means that panel members 66 and space members 74 are not affixed into position other than be being received between legs 50, 62 and 52, 64 of top rail 42 and base rail 54 and/or between legs 26, 28, 38, and 40 of end brackets 19, 30. The result of the "floating" characteristics of members 64 and 74 is that selected ones of members 64 and 74 may be easily removed if necessary. Further, floating members 64 and 74 allow for almost unlimited rack, i.e., allow for top rail 42 and base rail 54 to be oriented at almost any angle from horizontal, without incurring binding or other difficulties associated with additional securing hardware. When installing a panel 10, 101 on very steep terrain, it may be necessary to remove an upper or lower corner of panel member 64 to accommodate panel member 64 between rails 42 and 54. Floating members 64 and 74 additionally simplify construction be eliminating the installation of fasteners seen in other systems. In a preferred embodiment, fasteners in the system of the invention are limited to fasteners for securing end brackets 19, 30 to uprights and fasteners for securing top rail 42 and base rail 54 to end brackets 19 and 30.

Uprights 14, 114 and 18, 118 may be extended above top rail 42 to accommodate a clamp member 84 (FIGS. 7, 8, and 10) to secure an upper member, such as security member 86 (FIG. 10), decorative member 88 (FIG. 7) or other upper member to fence panel 10 or to gate panel 101.

A length of fence having a plurality of fence panels 10 of the invention may be constructed as follows. Uprights, such as posts 12 and 16, may be set into the ground. Any number of posts may be set at this stage of construction. End brackets 19 and 30 are then affixed to the appropriate sides of the posts to facilitate construction of fence panels 10. Base rails 54 are then located to span between adjacent posts. Base rails 54 are preferably bolted into place, e.g., to lower ends 22, 34 of end brackets 19, 30, respectively. Panel members 66 are then received between legs 62 and 64 of base rail 54 and between legs 26 and 28 of end bracket 19 and between legs 38 and 40 of end bracket 30. In one embodiment, spacer members, such as H-members 74 are received between selected adjacent panel members 66.

For construction of gate panel 101, uprights 112 and 116 are affixed to top frame member 113 and bottom frame member 115 to construct frame 111. End brackets 32 and 20 are then affixed to the inwardly facing sides of uprights 112 and 116. Base rail 54 is then affixed to bottom frame member 115 to span between adjacent uprights 112 and 116. Base rail 54 is preferably bolted into place. Panel members 66, if desired, are then received between legs 62 and 64 of base rail 54 and between legs 26 and 28 of end bracket 20 and between legs 38 and 40 of end bracket 32. In one embodiment, spacer members, such as H-members 74, are located between selected adjacent panel members 66. By providing a fence assembly that can be easily assembled piece by piece, fence construction may be easily accomplished by a single worker.

Figure 12:
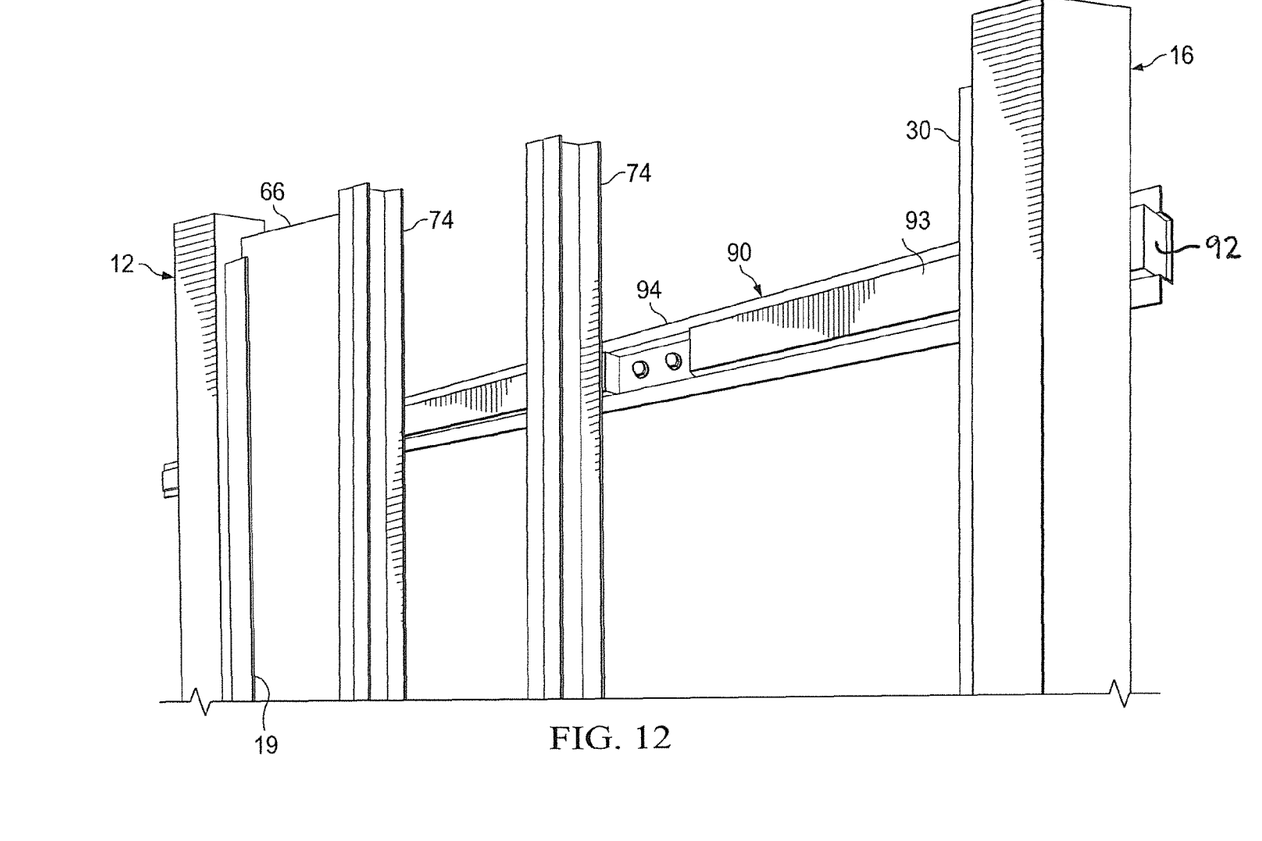
FIG. 12 is a perspective view of a support strip used to assist in fence assembly by stabilizing spacer members of the type shown in FIG. 1.

To further increase ease of assembly, a securing strip 90, such as a magnetic strip, may be affixed span from first upright 12 to second upright 16 or, alternatively, from first upright 112 to second upright 114. In this embodiment, first upright 12, second upright 16, first upright 112, and second upright 116 are preferably constructed of metal so that magnets 92 can support support strip 90 via magnetic attraction. In one embodiment, securing strip 90 has one or more magnets 92 installed to strip frame 94. Securing strip 90 may then receive a plurality of parallel spacer members, such as H-members 74, which may be magnetically secured to strip 90, as shown in FIG. 12, when spacer members 74 are placed between legs 62 and 64 of base rail 54. Spacer members 74 and adjacent panel members 66 are held in place while top rail 42 is installed. Support strip 90 preferably has a plurality of magnets 92 along a length of strip 90. Top rail 42 is then positioned to receive upper ends of spacer members 74 and panel member 66 between legs 50 and 52 of top rail 42. Top rail 42 is then secured, e.g., bolted, into place.

In another embodiment, securing strip 90 may have adhesive members 93 affixed to one side of support member 90. Adhesive members 93 should provide adhesive attraction of sufficient strength to hold H-members 74 in position until top rail 42 can be secured in place. However, adhesive members 93 should not provide an adhesive attraction so powerful that support member 90 cannot be removed after fence panel assembly is complete.

In one embodiment, securing strip 90 may be provided with cords extending from each end. The cords are preferably provided with attachment members, such as hooks, for engaging an upper end of uprights 12, 16 so that securing strip 90 can be hung in place, rather than secured to uprights 12, 16 by magnetic or adhesive attraction.

Therefore, it can be seen that construction of a length of fence, i.e., construction of a series of fence panels 10, including stationary panel 11 and gate panel 101 can be accomplished by a single worker, since each component of fence panel 10 may be constructed and installed individually and locating or erecting an assembled panel is not required.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A fence panel comprising:
   a first upright having a panel facing side;
   a second upright having a panel facing side;
   a first end bracket formed of a single piece, said first end bracket having a first web with an upright facing side and a panel facing side, said first end bracket having a first leg and a second leg extending from said first web;
   a second end bracket formed of a single piece, said second end bracket having a second web with an upright facing side and a panel facing side, said second end bracket having a first leg and a second leg extending from said second web;
   a top rail spanning between said first upright and said second upright, said top rail defining a first leg, a second leg and a web, wherein said first leg and said second leg of said top rail is received on an outside of said first leg and said second leg of said first end bracket and said second end bracket;
   a base rail below said top rail and spanning between said first upright and said second upright;
   at least one panel member in communication with said top rail and in communication with said base rail;
   wherein said panel member has a length substantially equal to a length of said first end bracket and said second end bracket;
   a first fastener engaging said panel facing side of said first web and securing said first end bracket to said panel facing side of said first upright;
   an upper end of said panel member is received between a first leg and a second leg of said top rail;
   a lower end of said panel member is received between a first leg and said second leg of said base rail.

2. The fence panel according to claim 1 wherein:
   said top rail has a first end, a second end, a web, a first leg and a second leg, wherein an upper end of said first end bracket is pivotally affixed to said first end of said top rail and wherein an upper end of said second end bracket is pivotally affixed to said top rail proximate said second end of said top rail;
   wherein said web forms an upper surface of said top rail.

3. The fence panel according to claim 2 wherein:
   said first leg defines a lipped hem having a first inwardly folded member;

said second leg defines a lipped hem having a second inwardly folded member;
wherein said first inwardly folded member and said second inwardly folded member maintain said panel member away from said first leg and said second leg, thereby creating in airspace therebetween.

4. The fence panel according to claim 1 wherein:
said base rail has a first end, a second end, a web, a first leg and a second leg, wherein a lower end of said first end bracket is pivotally attached to said base rail proximate said first end of said base rail and wherein a lower end of said second end bracket is pivotally attached to said base rail proximate said second end of said base rail.

5. The fence panel according to claim 1 wherein:
said at least one panel member is one of a plurality of vertical panel members.

6. The fence panel according to claim 1 wherein:
said web of said top rail forms an upper surface of said top rail;
an upper end of said panel member is received between said first leg and said second leg of said top rail, said panel member substantially fully inserted in said top rail wherein said upper end of said panel member is adjacent said web for promoting alignment of said top rail and said panel member;
said web of said base rail forms an upper surface of said base rail;
a lower end of said panel member is received between a first leg and said second leg of said base rail, said panel member substantially fully inserted in said base rail wherein said lower end of said panel member is adjacent said web for promoting alignment of said base rail and said panel member.

7. The fence panel according to claim 1 wherein:
said panel members are restrained by, but not affixed to, said top rail and said base rail, to facilitate ease of replacement of said panel members.

8. The fence panel according to claim 1 wherein:
said at least one panel member has a side edge slidably received between said first leg and said second leg of one of said first end bracket and said second end bracket.

9. The fence panel according to claim 1 further comprising:
a spacer member extending between said top rail and said base rail;
wherein said at least one panel member comprises a first panel member and a second panel member, said first panel member received adjacent to a first side of said spacer member and said second panel member received adjacent to a second side of said spacer member;
said spacer member defines a first receiving area on said first side of said spacer member;
said spacer member defines a second receiving area on said second side of said spacer member;
a side edge of one of said first panel member and said second panel member is slidably received within one of said first receiving area and said second receiving area of said spacer member.

10. The fence panel according to claim 9 wherein:
said spacer member has an H-shaped cross section.

11. The fence panel according to claim 10 wherein:
said spacer member defines a single center member that spans between said first receiving area and said second receiving area; and
said side edge of said first panel member and said second panel member is substantially fully inserted in said first and second receiving area, respectively, wherein said side edges are adjacent said single center member.

12. The fence panel according to claim 9 wherein:
said first panel member is uniform over a length spanning from said top rail to said base rail.

13. The fence panel according to claim 9 wherein:
no horizontal members that span between said first upright and said second upright are between said top rail and said base rail; and
said first panel member spans from said top rail to said base rail to form a length of said first panel;
wherein said length of said first panel member is comprised of more than one segment.

14. The fence panel according to claim 1 wherein:
at least one of said first upright and said second upright is a post.

15. The fence panel according to claim 1 wherein:
at least one of said first upright and said second upright is a wall.

16. The fence panel according to claim 1 wherein:
at least one of said first upright and said second upright is a fence panel.

17. A fence panel comprising:
a first upright having a panel facing side;
a second upright having a panel facing side;
a first end bracket having a first web with an upright facing side and a panel facing side, said first end bracket having a first leg and a second leg extending from said first web;
a second end bracket having a second web with an upright facing side and a panel facing side, said second end bracket having a first leg and a second leg extending from said second web;
a top rail spanning between said first upright and said second upright, said top rail defining a first leg, a second leg and a web;
a base rail below said top rail and spanning between said first upright and said second upright;
at least one panel member in communication with said top rail and in communication with said base rail;
a first fastener engaging said panel facing side of said first web and securing said first end bracket to said panel facing side of said first upright;
an upper end of said panel member is received between a first leg and a second leg of said top rail;
a lower end of said panel member is received between a first leg and said second leg of said base rail;
wherein an upper end of said first end bracket is pivotally affixed to said first end of said top rail and wherein an upper end of said second end bracket is pivotally affixed to said top rail proximate said second end of said top rail;
wherein said web forms an upper surface of said top rail;
wherein said upper end of said first end bracket is received between said first leg and said second leg of said top rail wherein said upper end of said first end bracket is substantially fully installed into said top rail wherein said upper end is adjacent said web;
wherein an upper end of said second end bracket is received between said first leg and said second leg of said top rail wherein said upper end of said first end bracket is substantially fully installed into said top rail wherein said upper end is adjacent said web.

18. A fence panel comprising:
a first upright having a panel facing side;
a second upright having a panel facing side;
a first end bracket formed of a single piece, said first end bracket having a first web with an upright facing side and a panel facing side, said first end bracket having a first leg and a second leg extending from said first web;

a second end bracket formed of a single piece, said second end bracket having a second web with an upright facing side and a panel facing side, said second end bracket having a first leg and a second leg extending from said second web;

a top rail spanning between said first upright and said second upright, said top rail defining a first leg, a second leg and a web, wherein said first leg and said second leg of said top rail is received on an outside of said first leg and said second lea of said first end bracket and said second end bracket;

a base rail below said top rail and spanning between said first upright and said second upright;

at least one panel member in communication with said top rail and in communication with said base rail;

a first fastener engaging said panel facing side of said first web and securing said first end bracket to said panel facing side of said first upright;

said web of said top rail forms an upper surface of said top rail;

an upper end of said panel member is received between said first leg and said second leg of said top rail, said panel member substantially fully inserted in said top rail wherein said upper end of said panel member is adjacent said web for promoting alignment of said top rail and said panel member;

said web of said bottom rail forms a lower surface of said bottom rail;

a lower end of said panel member is received between a first leg and said second leg of said base rail, said panel member substantially fully inserted in said base rail wherein said lower end of said panel member is adjacent said web for promoting alignment of said base rail and said panel member.

19. A fence panel comprising:

a first upright having a panel facing side;

a second upright having a panel facing side;

a first end bracket having a first web with an upright facing side and a panel facing side, said first end bracket having a first leg and a second leg extending from said first web;

a second end bracket having a second web with an upright facing side and a panel facing side, said second end bracket having a first leg and a second leg extending from said second web;

a top rail spanning between said first upright and said second upright, said top rail defining a first leg, a second leg and a web;

a base rail below said top rail and spanning between said first upright and said second upright;

at least one panel member in communication with said top rail and in communication with said base rail;

an upper end of said panel member is received between a first leg and a second leg of said top rail;

a lower end of said panel member is received between a first leg and said second leg of said base rail;

wherein said fence panel is secured together with fasteners limited to fasteners engaging said panel facing side of said web for securing said end brackets to said panel facing side of said uprights, a fastener for pivotally securing said first end of said top rail to said first end bracket, a fastener for pivotally securing said second end of said top rail to said second end bracket, a fastener for pivotally securing said first end of said bottom rail to said first end bracket, and a fastener for pivotally securing said second end of said bottom rail to said second end bracket.

* * * * *